(12) United States Patent
Quan et al.

(10) Patent No.: US 9,824,460 B2
(45) Date of Patent: Nov. 21, 2017

(54) METHOD, APPARATUS AND SYSTEM FOR ACQUIRING HEADCOUNT

(71) Applicant: ZTE Corporation, Shenzhen, Guangdong (CN)

(72) Inventors: Jiacheng Quan, Shenzhen (CN); Dong Wang, Shenzhen (CN); Gang Zeng, Shenzhen (CN)

(73) Assignee: XI'AN ZHONGXING NEW SOFTWARE CO.LTD., Xi'an (CN)

(*) Notice: Subject to any disclaimer, the term of this patent is extended or adjusted under 35 U.S.C. 154(b) by 240 days.

(21) Appl. No.: 14/647,180

(22) PCT Filed: Sep. 3, 2013

(86) PCT No.: PCT/CN2013/082886
§ 371 (c)(1),
(2) Date: May 26, 2015

(87) PCT Pub. No.: WO2013/189465
PCT Pub. Date: Dec. 27, 2013

(65) Prior Publication Data
US 2015/0317517 A1    Nov. 5, 2015

(30) Foreign Application Priority Data
Nov. 26, 2012 (CN) .......................... 2012 1 0485619

(51) Int. Cl.
*H04N 7/18* (2006.01)
*G06T 7/254* (2017.01)
(Continued)

(52) U.S. Cl.
CPC ........ *G06T 7/254* (2017.01); *G06F 17/30793* (2013.01); *G06K 9/00335* (2013.01);
(Continued)

(58) Field of Classification Search
CPC .......... G06K 9/00369; G06K 9/00335; G06K 9/00778; H04N 7/18; G06F 17/30793
(Continued)

(56) References Cited

U.S. PATENT DOCUMENTS

2007/0127774 A1   6/2007   Zhang
2008/0212099 A1   9/2008   Chen
(Continued)

FOREIGN PATENT DOCUMENTS

CN    101464946 A    6/2009
CN    101477641 A    7/2009
(Continued)

OTHER PUBLICATIONS

International Search Report in international application No. PCT/CN2013/082886, dated Dec. 19, 2013.
(Continued)

*Primary Examiner* — Robert Chevalier
(74) *Attorney, Agent, or Firm* — Oppedahl Patent Law Firm LLC

(57) ABSTRACT

A method, apparatus and system for acquiring headcount are provided. Data frames are acquired from a surveillance video, object models are set in the data frames, and a foreground image is extracted from the data frames, wherein the foreground image includes moving objects extracted from the data frames; the moving objects in the foreground image is matched with the object models, the headcount in corresponding data frames is acquired according to a result of the matching, characteristics of the matched moving objects are extracted, and the corresponding moving objects are tracked based on the characteristics; the actual headcount for a predetermined time segment of the surveillance video is acquired based on a result of the tracking and the acquired headcount for each of the data frames, wherein the result of the tracking includes: an indication of whether some or all of the data frames includes a same moving object.

17 Claims, 5 Drawing Sheets

(51) Int. Cl.
*G06K 9/00* (2006.01)
*G06F 17/30* (2006.01)

(52) U.S. Cl.
CPC ..... *G06K 9/00369* (2013.01); *G06K 9/00778* (2013.01); *H04N 7/18* (2013.01); *G06T 2207/30196* (2013.01); *G06T 2207/30232* (2013.01); *G06T 2207/30242* (2013.01)

(58) Field of Classification Search
USPC ........ 348/143, 152, 149; 386/226, 224, 248, 386/322
See application file for complete search history.

(56) References Cited

U.S. PATENT DOCUMENTS

| | | | |
|---|---|---|---|
| 2008/0303902 A1* | 12/2008 | Romer | G07F 19/207 348/143 |
| 2009/0220123 A1 | 9/2009 | Tojo | |
| 2010/0150471 A1* | 6/2010 | Cobb | G06K 9/4661 382/274 |
| 2011/0037852 A1 | 2/2011 | Ebling | |

FOREIGN PATENT DOCUMENTS

| | | |
|---|---|---|
| CN | 101540892 A | 9/2009 |
| CN | 101847206 A | 9/2010 |
| CN | 101877058 A | 11/2010 |
| CN | 101957996 A | 1/2011 |
| CN | 101540892 B | 5/2011 |
| CN | 101847206 B | 8/2012 |
| GB | 2475104 A | 5/2011 |
| JP | 2001206651 A | 7/2001 |
| WO | 2012132437 A1 | 10/2012 |

OTHER PUBLICATIONS

English Translation of the Written Opinion of the International Search Authority in international application No. PCT/CN2013/082886, dated Dec. 19, 2013.

Supplementary European Search Report in European application No. 13806208.8, dated Dec. 4, 2015.

\* cited by examiner

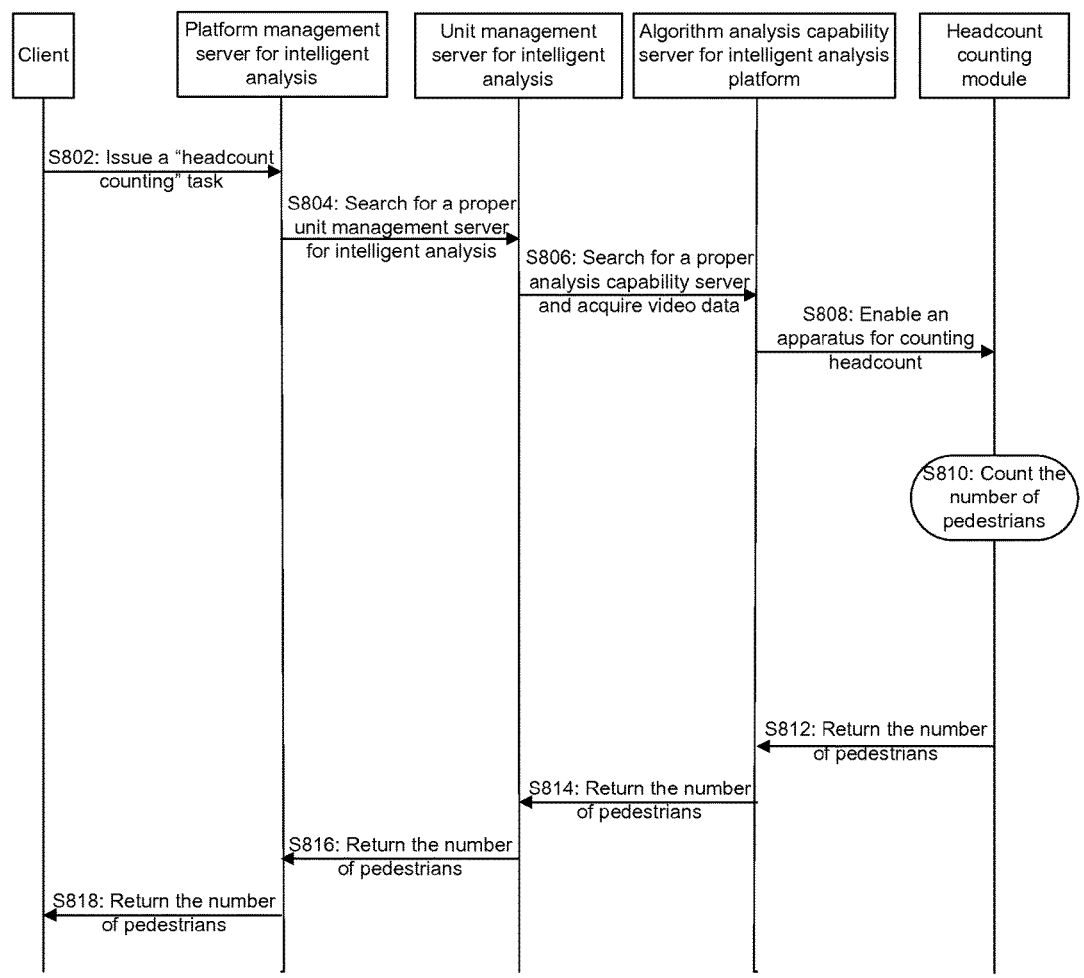

METHOD, APPARATUS AND SYSTEM FOR ACQUIRING HEADCOUNT

TECHNICAL FIELD

The present disclosure relates to the field of computer technology, and in particular to a method, apparatus and system for acquiring headcount.

BACKGROUND

In the prior art, a video surveillance system has capability of basic video surveillance, and an intelligent video surveillance platform, which has capability of intelligent algorithm analysis and various intelligence related service management functions at the platform side, is an important functional extension to the existing video surveillance system.

As a typical application of the intelligent video surveillance, a method for counting headcount based on image analysis has drawn sufficient attention. Headcount counting plays different roles in different applications. As to a shopping mall, it could be used to count customer flow (flow volume) and to analyse the temporal and spatial distribution of the customer flow, which are important data for improving the personnel allocation and the quality of service of the shopping mall; as to a public place such as park or station, it could be used to effectively analyse and calculate internal person-density and to alarm in time, so as to prevent incidents such as congestion or stampede.

Whereas, in most cases, existing systems for counting headcount fail in solving the problem of the inaccuracy in headcount counting caused by walk side by side, occlusion of objects, and etc.

SUMMARY

The embodiments of the disclosure provides a method, apparatus and system for acquiring headcount, which address the problem of the inaccuracy in headcount counting in the prior art.

The embodiments of the disclosure provides a method for acquiring headcount, which comprises: acquiring data frames from a surveillance video, setting object models in the data frames, and extracting a foreground image from the data frames, wherein the foreground image comprises moving objects extracted from the data frames; matching the moving objects in the foreground image with the object models, acquiring the headcount in corresponding data frames according to a result of the matching, extracting characteristics of the matched moving objects, and tracking the corresponding moving objects based on the characteristics; acquiring the actual headcount for a predetermined time segment of the surveillance video based on a result of the tracking and the acquired headcount for each of the data frames, wherein the result of the tracking comprises: an indication of whether some or all of the data frames includes a same moving object or not.

Preferably, the above-mentioned method further comprises: after extracting the foreground image from the data frames, eliminating interference in the foreground image.

Preferably, eliminating interference in the foreground image comprises: eliminating shadow and/or noise in the foreground image by means of a difference in colour space of a Hue Saturation Value (HSV) between a current data frame image and the background image.

Preferably, the method further comprises: after acquiring data frames from the surveillance video, setting a detection line in the data frames; the result of the tracking further comprises: a moving track of the same moving object in some or all of the data frames; accordingly, the method further comprises: after acquiring the actual headcount for the predetermined time segment of the surveillance video, acquiring the actual headcount in different directions for the predetermined time segment of the surveillance video based on the result of the tracking and position of the tracked moving objects relative to the detection line.

Preferably, extracting a foreground image from the data frames comprises: extracting the foreground image from the data frames by background modelling or by determining an inter-frame difference.

Preferably, the characteristics of the matched moving objects comprise one of the following: centre of the moving object, object window of the moving object, area of the moving object, grey-level histogram of the moving object, colourful histogram of the moving object, angular points of the moving object and angular points of the moving object at a sub-pixel level.

Preferably, acquiring the actual headcount for a predetermined time segment of the surveillance video comprises: counting the actual headcount for the predetermined time segment of the surveillance video with a counter.

The embodiments of the disclosure further provides an apparatus for acquiring headcount, which comprises: an acquisition module configured to acquire data frames from a surveillance video; a setting module configured to set object models in the data frames; a foreground image extracting module configured to extract a foreground image from the data frames, wherein the foreground image comprises moving objects extracted from the data frames;

an object matching module configured to match the moving objects in the foreground image with the object models and to acquire the headcount in corresponding data frames according to a result of the matching; a characteristic extracting module configured to extract characteristics of the matched moving objects and to track the corresponding moving objects based on the characteristics; a counting module configured to acquire the actual headcount for a predetermined time segment of the surveillance video based on a result of the tracking and the acquired headcount for each of the data frames, wherein the result of the tracking comprises: an indication of whether some or all of the data frames includes a same moving object or not.

Preferably, the foreground image extracting module is further configured to, after extracting the foreground image from the data frames, eliminate interference in the foreground image.

Preferably, the foreground image extracting module is configured to eliminate shadow and/or noise in the foreground image by means of a difference in colour space of a Hue Saturation Value (HSV) between a current data frame image and the background image.

Preferably, the setting module is further configured to set a detection line in the data frames; the counting module is further configured to acquire the actual headcount in different directions for the predetermined time segment of the surveillance video based on the result of the tracking and position of the tracked moving objects relative to the detection line, wherein the result of the tracking further comprises a moving track of a same moving object in some or all of the data frames.

Preferably, the foreground image extracting module is configured to extract the foreground image from the data frames by background modelling or by determining an inter-frame difference; the characteristics of the matched moving objects comprise one of the following: centre of the moving object, object window of the moving object, area of the moving object, grey-level histogram of the moving object, colourful histogram of the moving object, angular points of the moving object and angular points of the moving object at a sub-pixel level.

The embodiments of the disclosure further provide a system for acquiring headcount, which comprises: the above-mentioned apparatus for acquiring headcount and a data collector; the data collector is configured to collect data frames from a surveillance video.

Preferably, the above-mentioned system further comprises: a platform management server for intelligent analysis, one or more unit management servers for intelligent analysis and one or more algorithm analysis capability servers for intelligent analysis platform, wherein the apparatus for acquiring headcount is set in the one or more algorithm analysis capability servers for intelligent analysis platform; the data collector is configured to collect the data frames from the surveillance video and to send the collected data frames to the platform management server for intelligent analysis; the platform management server for intelligent analysis is configured to select a unit management server for intelligent analysis according to a headcount counting instruction from a client, to issue a first headcount counting task to the selected unit management server for intelligent analysis, and to report a result of the counting to the client, wherein the unit management servers for intelligent analysis are configured to select a algorithm analysis capability server for intelligent analysis platform according to the received first headcount counting task, to issue a second headcount counting task to the selected algorithm analysis capability server for intelligent analysis platform, and to report a result of the counting to the platform management server for intelligent analysis, wherein the second headcount counting task carries the collected data frames; the algorithm analysis capability servers for intelligent analysis platform are configured to enable the apparatus for acquiring headcount according to the received second headcount counting task so as to perform a headcount counting, and to report a result of the counting to the unit management server for intelligent analysis.

The beneficial effects of the embodiments of the disclosure include:

The correct number of pedestrians is obtained by setting object models and matching a foreground image with the object models, which solves the problem of the inaccuracy in headcount counting caused by walk side by side of the pedestrians or occlusion of objects, thereby improving the efficiency and accuracy in headcount counting.

The above description is merely an overview of the technical solution of the embodiments of the disclosure. The specific implementation of the disclosure is provided in the following description, so that the technical means of the disclosure could be acknowledged more clearly and implemented according to the content of the specification, and that the above-mentioned and other aims, features and advantages of the embodiments of the disclosure could be more apparent.

BRIEF DESCRIPTION OF THE DRAWINGS

Other advantages and benefits of the disclosure will be more apparent to those skilled in the art in reading the detailed description of the preferred implementation as following. These drawings are merely used to show the aim of the preferred implementation, but not to limit the disclosure. Furthermore, similar reference numbers throughout the drawings represent similar parts. In the drawings:

FIG. 8 is a flow chart for headcount counting based on an intelligent analysis platform according to the embodiments of the disclosure.

DETAILED DESCRIPTION

Figure 1:
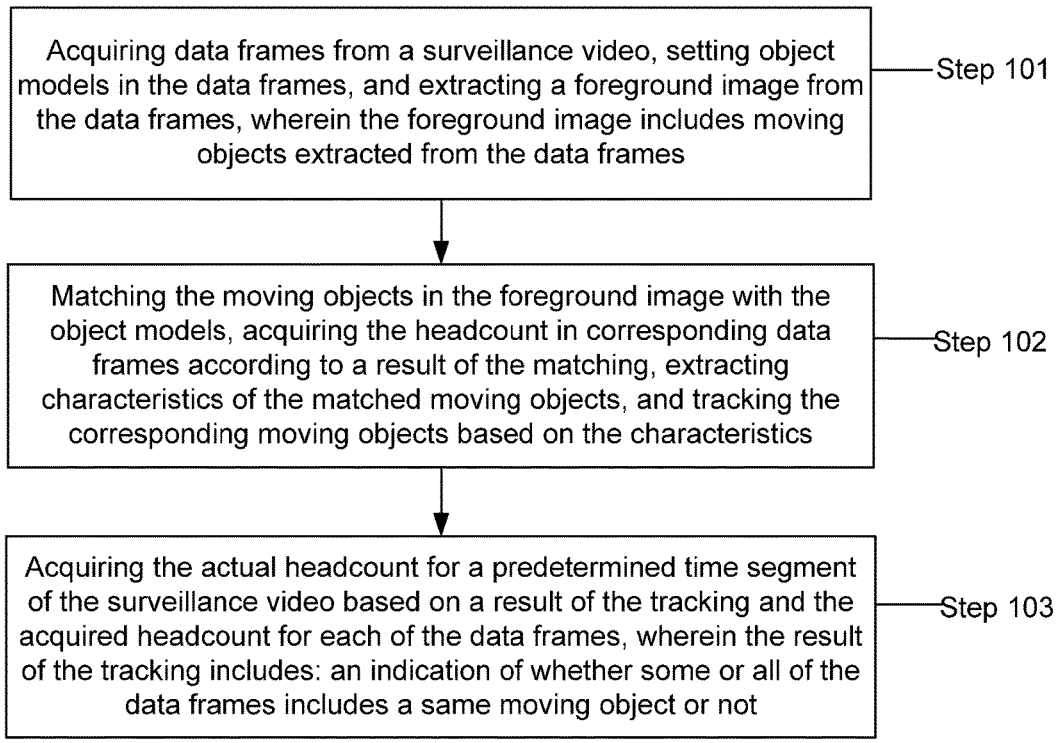
FIG. 1 is a flow chart of the method for acquiring headcount according to the embodiments of the disclosure.

The exemplary embodiments of the disclosure will be described in more detail with reference to the drawings. Although the exemplary embodiments of the disclosure are illustrated in the drawings, it should be understood that the disclosure could be implemented in various forms instead of being limited within the embodiments described herein. On the contrary, these embodiments are provided so that the disclosure could be understood more thoroughly and the scope of the disclosure could be conveyed to those skilled in the art completely.

In order to address the problem of the inaccuracy in headcount counting caused by walk side by side of the pedestrians or occlusion of objects in the prior art, the disclosure provides a method, apparatus and system for acquiring headcount. Specifically, a detection line and object models are set in frames of a surveillance video for headcount counting; a foreground image is extracted from the surveillance video and shadow thereof is eliminated, then the foreground image is matched with the object models to obtain the correct number of pedestrians; characteristics of each of moving objects are extracted; the objects are tracked based on the characteristics of each of the moving objects and counting is performed with a headcount counter. The disclosure is further described in more detail in combination with drawings and embodiments. It should be understood that the specific embodiments described here are merely used to explain the disclosure, but not to limit the disclosure.

Method Embodiments

According to embodiments of the disclosure, a method for acquiring headcount is provided. FIG. 1 is a flow chart of the method for acquiring headcount according to an embodiment of the disclosure. As shown in FIG. 1, the method for acquiring headcount according to the embodiments of the disclosure includes the following steps.

Step 101: data frames are acquired from a surveillance video, object models are set in the data frames, and a foreground image is extracted from the data frames, wherein the foreground image includes moving objects extracted from the data frames;

it should be noted that an object model is a set of matched characteristics of persons and there could be multiple object models, each corresponding to a shape of persons in a different state.

In an embodiment, extracting a foreground image from the data frames specifically includes: extracting the foreground image from the data frames by background modelling or by determining an inter-frame difference.

In Step 101, after extracting the foreground image from the data frames, interference in the foreground image is preferably eliminated.

In an embodiment, eliminating interference in the foreground image specifically includes: eliminating shadow and/or noise in the foreground image by means of a difference in colour space of a Hue Saturation Value (HSV) between a current data frame image and the background image.

Moreover, in an embodiment of the disclosure, after acquiring data frames from a surveillance video, a detection line may be set in the data frames, so as to acquire a more accurate result in headcount counting.

Step 102: the moving objects in the foreground image is matched with the object models, the headcount in corresponding data frames is acquired according to a result of the matching, characteristics of the matched moving objects are extracted, and the corresponding moving objects are tracked based on the characteristics.

In an embodiment, the characteristics of the matched moving objects include that of the matched moving objects extracted on the basis of at least one of the following information: centre of the moving object, object window of the moving object, area of the moving object, grey-level histogram of the moving object, colourful histogram of the moving object, angular points of the moving object, angular points of the moving object at a sub-pixel level and other constant characteristics of the moving object.

Step 103: the actual headcount for a predetermined time segment of the surveillance video is acquired based on a result of the tracking and the acquired headcount for each of the data frames. The result of the tracking includes: an indication of whether some or all of the data frames include a same moving object or not; the result of the tracking further includes: a moving track of a same moving object in some or all of the data frames.

For example, a headcount in a previous data frame being 5 and a head count in a next data frame being 6, it could be determined by extracting the characteristics of these 5 persons that 5 of the 6 persons in the next data frame and the 5 persons in the previous data frame are the same. Thus, the actual headcount in these two data frames is 6 rather than 5+6=11.

In Step 103, the actual headcount for the predetermined time segment of the surveillance video may be counted with a counter.

In the case that the detection line is set, after the actual headcount for the predetermined time segment of the surveillance video is acquired, it is possible to acquire the actual headcount in different directions for the predetermined time segment of the surveillance video based on the result of the tracking and position of the tracked moving objects relative to the detection line.

In practical applications, the counter performs counting based on the position of the moving objects relative to the detection line. For example, when an object moves from one side of the detection line to the other side, the headcount in the corresponding direction is increased by 1.

The above technical solution of the embodiments of the disclosure is described in detail in combination with drawings.

Figure 2:
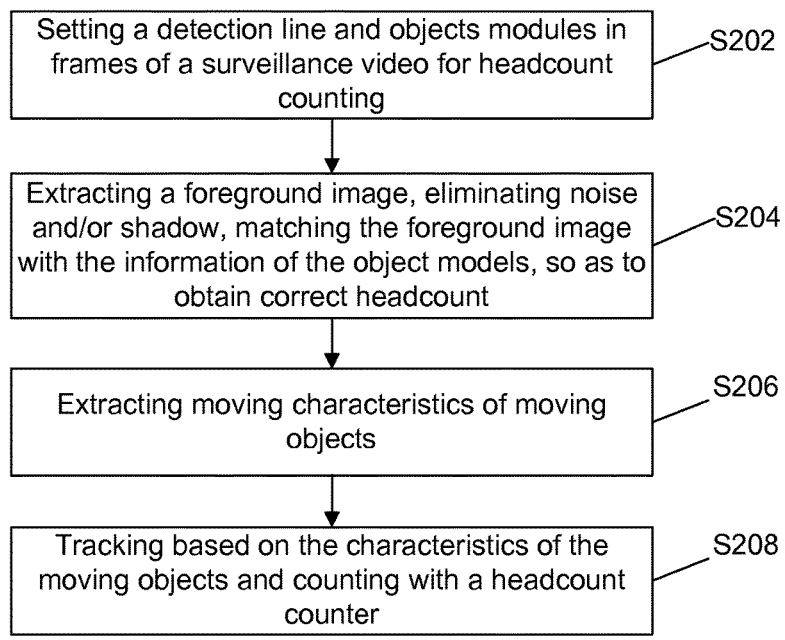
FIG. 2 is a detailed processing flow chart of the method for acquiring headcount according to the embodiments of the disclosure.

FIG. 2 is a detailed processing flow chart of the method for acquiring headcount according to an embodiment of the disclosure. As shown in FIG. 2, the method includes the following steps.

Step S202: a detection line and object models are set in frames of a surveillance video for headcount counting.

Step S204: a foreground image is extracted, noise and/or shadow is eliminated, the foreground image is matched with the information of the object models, so as to obtain correct headcount.

Step S206: moving characteristics of moving objects are extracted.

Step S208: tracking is performed based on the characteristics of the moving objects and counting is performed with a headcount counter.

In this embodiment, based on the fact that the object models and the detection line are set according to an actual surveillance scene and that the foreground image is cut into the correct number of pedestrians according to the object models, the problem of the inaccuracy in counting caused by the occlusion of the objects is addressed, therefore achieving the effect of improving the efficiency and accuracy in counting.

In an embodiment, Step S204 could be based on at least one of the following methods for extracting a foreground image: background modelling or determining an inter-frame difference. The foreground could be matched with the information of the object models so as to obtain the correct number of pedestrians.

In an embodiment, in Step S206, the characteristics of the moving objects are extracted on the basis of at least one of the following information: centre of the moving object, object window of the moving object, area of the moving object, grey-level histogram of the moving object, colourful histogram of the moving object, angular points of the moving object, angular points of the moving object at a sub-pixel level and constant characteristics of the moving object.

In an embodiment, in Step S208, the headcount counter performs counting based on the position of the moving objects relative to the detection line. When a moving object moves from one side of the detection line to the other side, the headcount in the corresponding direction increase by 1.

In conclusion, in the technical solution of the embodiments of the disclosure, the foreground image is matched with the information of the object models by setting the detection line and the object models, so as to obtain the correct number of pedestrians and address the problem of the inaccuracy in headcount counting caused by walk side by side of pedestrians or occlusion of objects, therefore achieving the effect that the efficiency and accuracy in counting are improved.

Apparatus Embodiments

Figure 3:
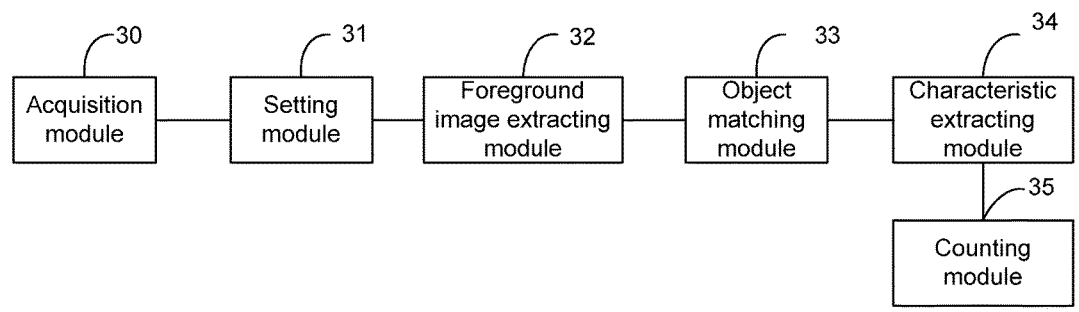
FIG. 3 is a structural diagram of the apparatus for acquiring headcount according to the embodiments of the disclosure.

The embodiments of the disclosure provide an apparatus for acquiring headcount. FIG. 3 is a structural diagram of the apparatus for acquiring headcount according to the embodiments of the disclosure. As shown in FIG. 3, the apparatus for acquiring headcount according to the embodiments of the disclosure includes an acquisition module 30, a setting module 31, a foreground image extracting module 32, an object matching module 33, a characteristic extracting module 34 and a counting module 35, which are then described in detail.

The acquisition module 30 is configured to acquire data frames from a surveillance video.

The setting module 31 is configured to set object models in the data frames.

The foreground image extracting module 32 is configured to extract a foreground image from the data frames, wherein the foreground image includes moving objects extracted from the data frames.

Here, the foreground image extracting module 32 may be further configured to, after extracting the foreground image from the data frames, eliminate interference in the foreground image. Furthermore, the foreground image extracting module 32, may specifically be configured to eliminate shadow and/or noise in the foreground image by means of a difference in colour space of a Hue Saturation Value (HSV) between a current data frame image and the background image.

The foreground image extracting module 32 may extract the foreground image from the data frames by background modelling or by determining an inter-frame difference.

The object matching module 33 is configured to match the moving objects in the foreground image with the object models and to acquire the headcount in corresponding data frames according to a result of the matching.

The characteristic extracting module 34 is configured to extract characteristics of the matched moving objects and to track the corresponding moving objects based on the characteristics.

The characteristic extracting module 34 may specifically be configured to extract the characteristics of the matched moving objects by means of at least one of the following: centre of the moving object, object window of the moving object, area of the moving object, grey-level histogram of the moving object, colourful histogram of the moving object, angular points of the moving object, angular points of the moving object at a sub-pixel level and other constant characteristics of the moving object.

The counting module 35 is configured to acquire the actual headcount for a predetermined time segment of the surveillance video based on a result of the tracking and the acquired headcount for each of the data frames. The result of the tracking includes: an indication of whether some or all of the data frames includes a same moving object or not.

The counting module 35 may specifically be configured to count the actual headcount for the predetermined time segment of the surveillance video with a counter.

Preferably, in the embodiments of the disclosure, the setting module 31 is further configured to set a detection line in the data frames; the counting module 35 is further configured to acquire the actual headcount in different directions for the predetermined time segment of the surveillance video based on the result of the tracking and position of the tracked moving objects relative to the detection line. The result of the tracking further includes a moving track of a same moving object in some or all of the data frames. In practical applications, it is possible to perform counting based on the position of the moving objects relative to the detection line with the headcount counter.

In practical applications, the acquisition module, setting module, foreground image extracting module, object matching module, characteristic extracting module and counting module may be realized with CPU, DSP or FPGA.

The above technical solution of the embodiments of the disclosure is described in detail in combination with drawings.

Figure 4:
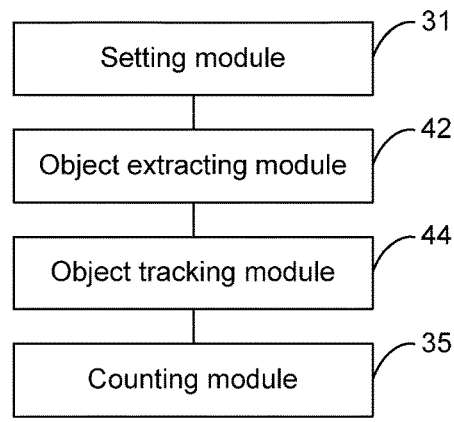
FIG. 4 is a detailed structural diagram of the apparatus for acquiring headcount according to the embodiments of the disclosure.

FIG. 4 is a detailed structural diagram of the apparatus for acquiring headcount according to the embodiments of the disclosure. As shown in FIG. 4, the apparatus for acquiring headcount includes: a setting module 31 configured to set object models and a detection line in frames of a surveillance video for counting; an object extracting module 42 (corresponding to above foreground image extracting image and object matching module) configured to extract a foreground image in a surveillance scene and to match the foreground image with the information of the object models so as to obtain the correct number of pedestrians; an object tracking module 44 (corresponding to above characteristic extracting module) configured to track the moving track of each of the pedestrian objects; and a counting module 35 configured to perform an object counting based on the position of the pedestrian objects relative to the detection line. The setting module 31, the object extracting module 42, the object tracking module 44 and the counting module 35 are coupled successively.

In this embodiment, the correct number of pedestrians is obtained by setting the object models and the detection line according to an actual surveillance scene and by matching the foreground image with the information of the object models, and thus the problem of the inaccuracy in counting caused by the occlusion of the objects is addressed, therefore achieving the effect of improving the efficiency and accuracy in counting.

In an embodiment, the object extracting module 42 may use at least one of the following methods for extracting a foreground image: background modelling or determining an inter-frame difference. The foreground could be matched with the information of the object models so as to obtain the correct number of pedestrians.

In an embodiment, the object tracking module 44 tracks the moving objects on the basis of at least one of the following characteristics of object: centre of the moving object, object window of the moving object, area of the moving object, grey-level histogram of the moving object, colourful histogram of the moving object, angular points of the moving object, angular points of the moving object at a sub-pixel level and constant characteristics of the moving object.

In an embodiment, the headcount counter in the counting module 35 performs counting based on the position of the moving objects relative to the detection line. When an object moves from one side of the detection line to the other side, the headcount in the corresponding direction is increased by 1.

Figure 5:
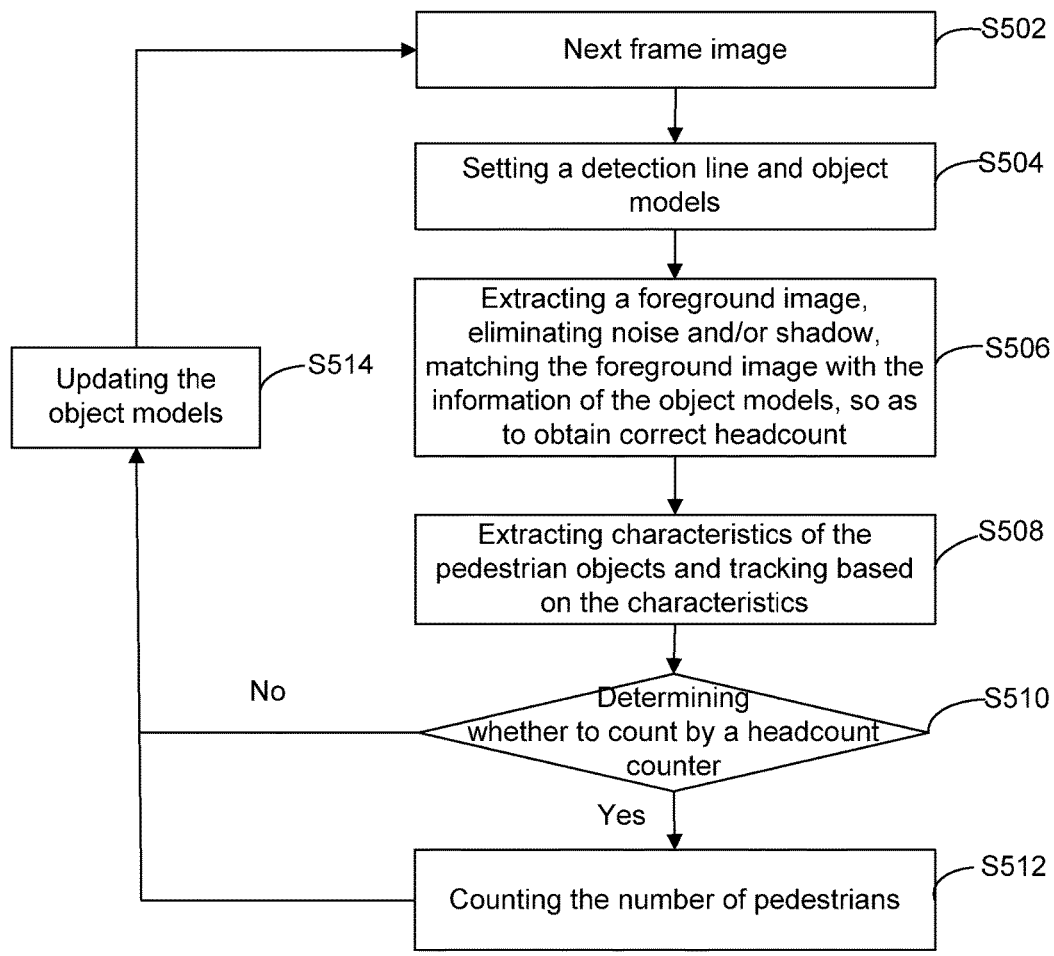
FIG. 5 is a processing flow chart of the apparatus for acquiring headcount according to the embodiments of the disclosure.

FIG. 5 is a processing flow chart of the apparatus for acquiring headcount according to the embodiments of the disclosure. As shown in FIG. 5, the processing includes the following steps.

Step S502: a next frame image is acquired: an intelligent analysis platform surveils the traffic video information in real time; the object extracting module acquires the next frame image collected by a video collecting device through an algorithm analysis capability server for intelligent analysis platform.

Step S504: a detection line and object models are set: the whole video sequence is read in frames and a detection line and object modules are set with respect the first frame (the detection line and the object models could be set by a user in the interface of the video surveillance).

Step S506: a foreground image is extracted, noise and/or shadow is eliminated, and the foreground image is matched with the information of the object models, so as to obtain correct headcount.

Step S508: characteristics of the pedestrian objects are extracted and tracking is performed based on these characteristics. The moving objects are tracked on the basis of at least one of the following characteristics of object: centre of the moving object, object window of the moving object, area of the moving object, grey-level histogram of the moving object, colourful histogram of the moving object, angular points of the moving object, angular points of the moving object at a sub-pixel level and constant characteristics of the moving object.

Step S510: a headcount counter determines whether to count: counting is performed when a pedestrian moves from one side of the detection line to the other side; otherwise, the processing goes to Step S514.

Step S512: the pedestrians are counted and then the processing goes to Step S514. Step S514: updating the background model and going to Step S502.

In conclusion, in the technical solution of the embodiments of the disclosure, the foreground image is matched with the information of the object models by setting the detection line and the object models, so as to obtain the correct number of pedestrians and address the problem of the inaccuracy in headcount counting caused by walk side by side of pedestrians or occlusion of objects, therefore achieving the effect that the efficiency and accuracy in counting are improved.

System Embodiments

Figure 6:
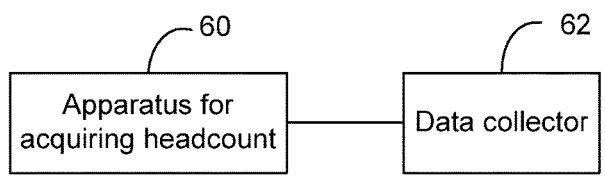
FIG. 6 is a structural diagram of the system for acquiring headcount according to the embodiments of the disclosure.

According to the embodiments of the disclosure, a system for acquiring headcount is provided. FIG. 6 is a structural diagram of the system for acquiring headcount according to an embodiment of the disclosure. As shown in FIG. 6, the system for acquiring headcount according to the embodiment of the disclosure includes: the apparatus for acquiring headcount 60 according to above embodiments of the apparatus and a data collector 62, which are then described in detail.

The apparatus for acquiring headcount 60 has been described in detail in above-mentioned embodiments of the apparatus and will not be described here. The data collector 62 is configured to collect data frames from a surveillance video.

Preferably, in the embodiments of the disclosure, the above system for acquiring headcount further includes: a platform management server for intelligent analysis, one or more unit management servers for intelligent analysis and one or more algorithm analysis capability servers for intelligent analysis platform. The apparatus for acquiring headcount 60 is set in the one or more algorithm analysis capability servers for intelligent analysis platform.

The data collector 62 may further be configured to collect the data frames from the surveillance video and to send the collected data frames to the platform management server for intelligent analysis.

The platform management server for intelligent analysis may be configured to select a unit management server for intelligent analysis according to a headcount counting task from a client, to issue a first headcount counting task to the selected unit management server for intelligent analysis, and to report a result of the counting to the client. The first headcount counting task carries the collected data frames.

The unit management servers for intelligent analysis are configured to select an algorithm analysis capability server for intelligent analysis platform according to the received first headcount counting task, to issue a second headcount counting task to the selected algorithm analysis capability server for intelligent analysis platform, and to report a result of the counting to the platform management server for intelligent analysis. The second headcount counting task carries the collected data frames.

The algorithm analysis capability servers for intelligent analysis platform are configured to enable the headcount acquiring apparatus 60 to perform counting according to the received second headcount counting task, and to report a result of the counting to the unit management server for intelligent analysis.

The above technical solution of the embodiments of the disclosure is described in detail in combination with drawings.

In the embodiments of the disclosure, the headcount counting is implemented by using existing intelligent analysis platforms and incorporating above apparatus for acquiring headcount into the algorithm analysis capability servers for intelligent analysis platform. On one hand, the performance of the system for counting headcount is improved by taking advantages of existing intelligent analysis platforms; on the other hand, new functions may be also incorporated into the existing intelligent analysis platforms.

Figure 7:
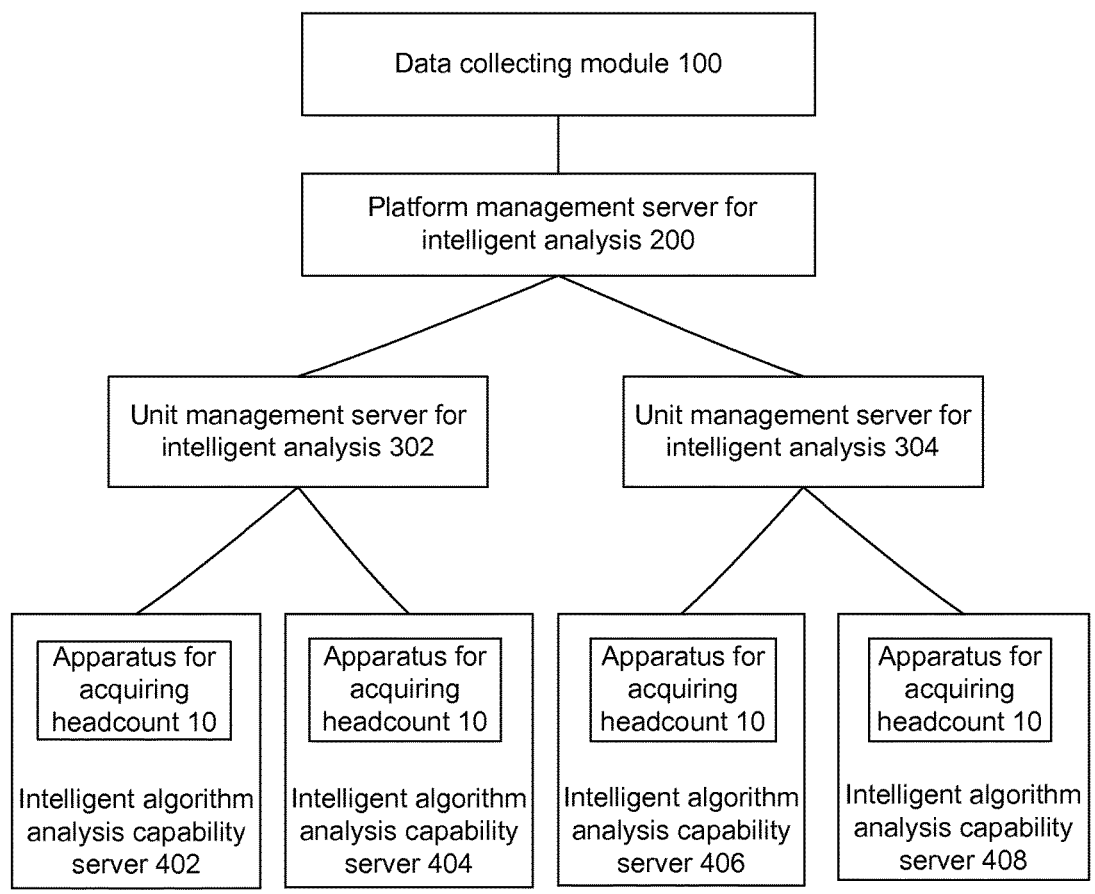
FIG. 7 is a logical architecture chart of the intelligent video surveillance system according to the embodiments of the disclosure.

FIG. 7 is a logical architecture chart of the intelligent video surveillance system according to the embodiments of the disclosure. As shown in FIG. 7, the video surveillance system includes: a data collecting module 100, a platform management server for intelligent analysis 200, unit management servers for intelligent analysis (302, 304) and algorithm analysis capability servers for intelligent analysis platform (402, 404, 406, 408), in which the algorithm analysis capability server for intelligent analysis platform includes one apparatus for acquiring headcount 10.

The functions of each module in the intelligent video surveillance system are described as follows.

The data collecting module 100 collects data for the surveillance scene and introduces collected video data into the platform management server for intelligent analysis 200.

The platform management server for intelligent analysis 200 implements a communication interface with the data collecting module 100, manages intelligent analysis and processing units, the result of intelligent analysis, and unit management servers for intelligent analysis 302 and 304.

The unit management servers for intelligent analysis manage multiple algorithm analysis capability servers for intelligent analysis platform, implement issuing and execution of an intelligent analysis timing plan, and implement load balancing scheduling of the algorithm analysis capability servers for intelligent analysis platform.

The algorithm analysis capability servers for intelligent analysis platform execute specific intelligent algorithm analysis, report an alarm or an event notice of analysis result, and carry out snapshoots in the course of the intelligent analysis.

In the embodiments of the disclosure, the headcount counting is implemented by incorporating the apparatus for acquiring headcount into the algorithm analysis capability servers for intelligent analysis platform.

FIG. 8 is a flow chart for headcount counting based on an intelligent analysis platform according to the embodiments of the disclosure. As shown in FIG. 8, the processing includes the following steps.

Step S802: a client issues a "headcount counting" task to a platform management server for intelligent analysis, sets a detection line and object models in the interface, and configures corresponding algorithm parameters.

Step S804: the platform management server for intelligent analysis searches for a proper unit management server for intelligent analysis to execute the task.

Step S806: the unit management server for intelligent analysis searches for a proper algorithm analysis capability server for intelligent analysis platform to execute the task and starts to acquire real-time data of surveillance video.

Step S808: the algorithm analysis capability server for intelligent analysis platform enables the apparatus for acquiring headcount.

Step S810: the apparatus for acquiring headcount counts headcount with the method for headcount counting based on object model matching.

Step S812: the apparatus for acquiring headcount returns the number of pedestrians to the algorithm analysis capability server for intelligent analysis platform.

Step S814: the algorithm analysis capability server for intelligent analysis platform returns the number of pedestrians to the unit management server for intelligent analysis.

Step S816: the unit management server for intelligent analysis returns the number of pedestrians to the platform management server for intelligent analysis;

Step S818: the platform management server for intelligent analysis returns the number of pedestrians to the client.

In conclusion, it can be seen from the above description that the embodiments of the disclosure realize following technical effects:

1. In the embodiments of the disclosure, a combination of the apparatus for acquiring headcount and the intelligent analysis platform makes it possible to count pedestrians for multichannel surveillance video streams at the same time, therefore greatly reducing the cost. In addition, the good functions of the existing intelligent analysis platform may be fully used so as to increase the stability of the system for counting headcount.

2. In the embodiments of the disclosure, a user himself may set a detection line and object models in the interface of video surveillance, which may be convenient, efficient and intuitive; and the foreground image may be matched with the information of the object models so as to obtain the correct number of pedestrians, therefore increasing the efficiency of processing.

3. The embodiments of the disclosure use the headcount counting based on object model matching, which may avoid the problem of the inaccuracy in counting caused by the occlusion of the objects in traditional methods for counting headcount.

4. The embodiments of the disclosure may flexibly select effective methods for extracting a moving foreground and tracking objects, which facilitates subsequent improvements.

5. The method for counting in the embodiments of the disclosure may avoid interference from shadow and the like effectively, which leads to a high accuracy in counting, and the requirement in managing the surveillance scene can be satisfied better.

The algorithm and display provided here are not inherently related to any specific computer, virtual system or other devices. Different general-purpose systems also may be used together based on the teachings here. According to above description, the structure required for constitute such a system is apparent. Furthermore, the present disclosure does not direct to any specific programming language. It should be understood that various programming languages may be used to realize the content of the disclosure described here, and the description directed to specific languages aims at disclosing the optimum implementation of the disclosure.

The specification provided here provides a plenty of specific details. Whereas, it can be understood that the embodiments of the disclosure may be implemented without those specific details. In some examples, method, structure and technology well known are not illustrated in detail, so as not to make the understanding to the specification ambiguous.

Similarly, it should be understood that, in the above description of the exemplary embodiments of the disclosure, different characteristics of the disclosure sometimes are grouped into a single embodiment, figure or description thereto in order to simplify the disclosure and to be helpful in understanding one or more of different aspects of the disclosure. Whereas, the disclosed method should not be interpreted to reflecting the intention as following: the disclosure to be protected claims features more than that recorded clearly in each of the claims. More exactly, the inventive aspect consists in less than all of the features of a single embodiment previously disclosed, as that has been reflected in following claims. Thus, the claims corresponding to specific implementations are definitely incorporated in their corresponding implementations, in which each claim acts by itself as a single implementation of the disclosure.

Those skilled in the art may understand that the modules in the devices of the embodiments may be adaptively changed and arranged in one or more devices different from that embodiment. The modules, units or components in the embodiments may be combined into one module, unit or component, and may be divided into several sub-modules, sub-units or sub-components. All of the features disclosed in the specification (or accompanying claims, abstract and drawings) as well as all of the processes or unit of any method or device disclosed in this way may be in any combination, except for at least some of the features and/or processes or units that are mutually exclusive. Unless it is definitely stated otherwise, each feature disclosed in the specification (including accompanying claims, abstract and drawings) may be replaced by a substitutive feature which provides the same, equivalent or similar objective.

Furthermore, it may be understood by those skilled in the art that although some of the embodiments include some but not all of the features included in other embodiments, the combinations of features from different embodiments is within the scope of the disclosure and forms different embodiments. For example, in following claims, any of the embodiments to be protected may be used in any combination.

The embodiments of parts of the disclosure may be implemented in hardware, or in software module running on one or more processors, or in combination thereof. It should be understood by those skilled in the art that, in practice, it is possible to realize some of all of the functions of some or all of the part of the apparatus and system for acquiring headcount according to the embodiments of the disclosure with microprocessor or DSP. The disclosure may be further realized as to execute the program of some or all of the devices or apparatus (e.g. computer program and computer program product) of the method described here. Such program for realizing the disclosure may be stored in a computer-readable medium or in the form of one or more signals. Such signal may be downloaded from Internet sites, or provided by a signal on a carrier, or provided in any other form.

It should be noted that the above embodiments intends to illustrate the disclosure, but not to limit it, and those skilled in the art can design substitutive embodiments without going beyond the scope of the claims. In the claims, any Apparently, those skilled in the art can make various modifications and variations to the disclosure without departing from the spirit and scope of the disclosure. Thus, if these modifications and variations of the disclosure fall within the scope of the claims of the disclosure and equivalent technologies thereof, the disclosure is also intended to include these modifications and variations.

The invention claimed is:

1. A method for acquiring headcount, comprising:
acquiring data frames from a surveillance video, setting object models, each being a set of matched characteristics of a person and corresponding to a shape of the person in different state, in the data frames, and extracting a foreground image from the data frames, wherein the foreground image comprises moving objects extracted from the data frames;
matching the moving objects in the foreground image with the object models, acquiring the headcount in corresponding data frames according to a result of the matching, extracting characteristics of the matched moving objects, and tracking the corresponding moving objects based on the characteristics; and
acquiring the actual headcount for a predetermined time segment of the surveillance video based on a result of the tracking and the acquired headcount for each of the data frames, wherein the result of the tracking comprises: an indication of whether some or all of the data frames includes a same moving object or not,
wherein the method further comprises: setting, through an interface of the surveillance video, a detection line in the data frames after acquiring data frames from the surveillance video, wherein the result of the tracking further comprises: a moving track of the same moving object in some or all of the data frames;
accordingly, wherein the method further comprises: after acquiring the actual headcount for the predetermined time segment of the surveillance video, and
acquiring the actual headcount in different directions for the predetermined time segment of the surveillance video based on the result of the tracking and position of the tracked moving objects relative to the detection line, comprising: when detecting one of the tracked moving objects moves from one side of the detection line to another side, increasing the headcount in a corresponding direction by 1.

2. The method according to claim 1, wherein the method further comprises: after extracting the foreground image from the data frames, eliminating interference in the foreground image.

3. The method according to claim 2, wherein the eliminating interference in the foreground image comprises: eliminating shadow and/or noise in the foreground image by means of a difference in colour space of a Hue Saturation Value (HSV) between a current data frame image and the background image.

4. The method according to claim 1, wherein the extracting a foreground image from the data frames comprises: extracting the foreground image from the data frames by background modelling or by determining an inter-frame difference.

5. The method according to claim 1, wherein the characteristics of the matched moving objects comprise one of the following: centre of the moving object, object window of the moving object, area of the moving object, grey-level histogram of the moving object, colourful histogram of the moving object, angular points of the moving object and angular points of the moving object at a sub-pixel level.

6. The method according to claim 1, wherein the acquiring the actual headcount for a predetermined time segment of the surveillance video comprises: counting the actual headcount for the predetermined time segment of the surveillance video with a counter.

7. An apparatus for acquiring headcount, comprising:
an acquisition module, configured to acquire data frames from a surveillance video;
a setting module, configured to set object models in the data frames, wherein each of the object models is a set of matched characteristics of a person and corresponds to a shape of the person in a different state;
a foreground image extracting module, configured to extract a foreground image from the data frames, wherein the foreground image comprises moving objects extracted from the data frames;
an object matching module, configured to match the moving objects in the foreground image with the object models and to acquire the headcount in corresponding data frames according to a result of the matching;
a characteristic extracting module, configured to extract characteristics of the matched moving objects and to track the corresponding moving objects based on the characteristics;
a counting module, configured to acquire the actual headcount for a predetermined time segment of the surveillance video based on a result of the tracking and the acquired headcount for each of the data frames, wherein the result of the tracking comprises: an indication of whether some or all of the data frames includes a same moving object or not,
wherein the setting module is further configured to set a detection line in the data frames through an interface of the surveillance video; and
wherein the counting module is further configured to acquire the actual headcount in different directions for the predetermined time segment of the surveillance video based on the result of the tracking and position of the tracked moving objects relative to the detection line, wherein when detecting one of the tracked moving objects moves from one side of the detection line to another side, the headcount in a corresponding direction is increased by 1.

8. The apparatus according to claim 7, wherein the foreground image extracting module is further configured to, after extracting the foreground image from the data frames, eliminate interference in the foreground image.

9. The apparatus according to claim 8, wherein the foreground image extracting module is configured to eliminate shadow and/or noise in the foreground image by means of a difference in colour space of a Hue Saturation Value (HSV) between a current data frame image and the background image.

10. The apparatus according to claim 7, wherein the foreground image extracting module is configured to extract the foreground image from the data frames by background modelling or by determining an inter-frame difference.

11. The apparatus according to claim 7, wherein the characteristics of the matched moving objects comprise one of the following: centre of the moving object, object window of the moving object, area of the moving object, grey-level histogram of the moving object, colourful histogram of the moving object, angular points of the moving object and angular points of the moving object at a sub-pixel level.

12. The apparatus according to claim 7, wherein the counting module is configured to count the actual headcount for the predetermined time segment of the surveillance video with a counter.

13. A system for acquiring headcount, comprising an apparatus for acquiring headcount and a data collector,
wherein the data collector is configured to collect data frames from a surveillance video, and
wherein the apparatus for acquiring headcount comprises:
an acquisition module, configured to acquire data frames from a surveillance video;
a setting module, configured to set object models in the data frames, wherein each of the object models is a set of matched characteristics of a person and corresponds to a shape of the person in a different state;
a foreground image extracting module, configured to extract a foreground image from the data frames, wherein the foreground image comprises moving objects extracted from the data frames;
an object matching module, configured to match the moving objects in the foreground image with the object models and to acquire the headcount in corresponding data frames according to a result of the matching;
a characteristic extracting module, configured to extract characteristics of the matched moving objects and to track the corresponding moving objects based on the characteristics;
a counting module, configured to acquire the actual headcount for a predetermined time segment of the surveillance video based on a result of the tracking and the acquired headcount for each of the data frames, wherein the result of the tracking comprises: an indication of whether some or all of the data frames includes a same moving object or not,
wherein the setting module is further configured to set a detection line in the data frames through an interface of the surveillance video; and
wherein the counting module is further configured to acquire the actual headcount in different directions for the predetermined time segment of the surveillance video based on the result of the tracking and position of the tracked moving objects relative to the detection line, wherein when detecting one of the tracked moving objects moves from one side of the detection line to another side, the headcount in a corresponding direction is increased by 1.

14. The system according to claim 13, wherein the system further comprises: a platform management server for intelligent analysis, one or more unit management servers for intelligent analysis and one or more algorithm analysis capability servers for intelligent analysis platform, wherein the apparatus for acquiring headcount is set in the one or more algorithm analysis capability servers for intelligent analysis platform;
wherein the data collector is configured to collect the data frames from the surveillance video and to send the collected data frames to the platform management server for intelligent analysis;
wherein the platform management server for intelligent analysis is configured to select a unit management server for intelligent analysis according to a headcount counting instruction from a client, to issue a first headcount counting task to the selected unit management server for intelligent analysis, and to report a result of the counting to the client, wherein the first headcount counting task carries the collected data frames;
wherein the unit management servers for intelligent analysis are configured to select a algorithm analysis capability server for intelligent analysis platform according to the received first headcount counting task, to issue a second headcount counting task to the selected algorithm analysis capability server for intelligent analysis platform, and to report a result of the counting to the platform management server for intelligent analysis, wherein the second headcount counting task carries the collected data frames; and
wherein the algorithm analysis capability servers for intelligent analysis platform are configured to enable the apparatus for acquiring headcount according to the received second headcount counting task so as to perform a headcount counting, and to report a result of the counting to the unit management server for intelligent analysis.

15. The system according to claim 13, wherein the foreground image extracting module is further configured to, after extracting the foreground image from the data frames, eliminate interference in the foreground image.

16. The system according to claim 15, wherein the foreground image extracting module is configured to eliminate shadow and/or noise in the foreground image by means of a difference in colour space of a Hue Saturation Value (HSV) between a current data frame image and the background image.

17. The system according to claim 13, wherein the foreground image extracting module is configured to extract the foreground image from the data frames by background modelling or by determining an inter-frame difference.

* * * * *